United States Patent Office 3,798,342
Patented Mar. 19, 1974

3,798,342
PROCESS FOR PRODUCING HIGH QUALITY SPRAY DRIED COFFEE
Arno Huste, Rego Park, N.Y., assignor to General Foods Corporation, White Plains, N.Y.
Continuation of abandoned application Ser. No. 20,949, Mar. 19, 1970. This application Aug. 23, 1972, Ser. No. 282,994
Int. Cl. A23f 1/08
U.S. Cl. 426—471
6 Claims

ABSTRACT OF THE DISCLOSURE

A spray dried soluble coffee of improved quality is produced by carefully controlling the spray drying conditions within specified limitations. The extract is concentrated to a solids content of 31 to 40% and is cooled to between 30 to 60° F. prior to drying. The dryer inlet air temperature is maintained from 300 to 550° F., and the outlet temperature is maintained between 190 to 230° F. The pressure at the spray dryer nozzle is maintained at from 700 to 2500 p.s.i.g. and must be sufficient to produce droplets with a maximum size of from 100 to 300 microns.

---

Figure 1:
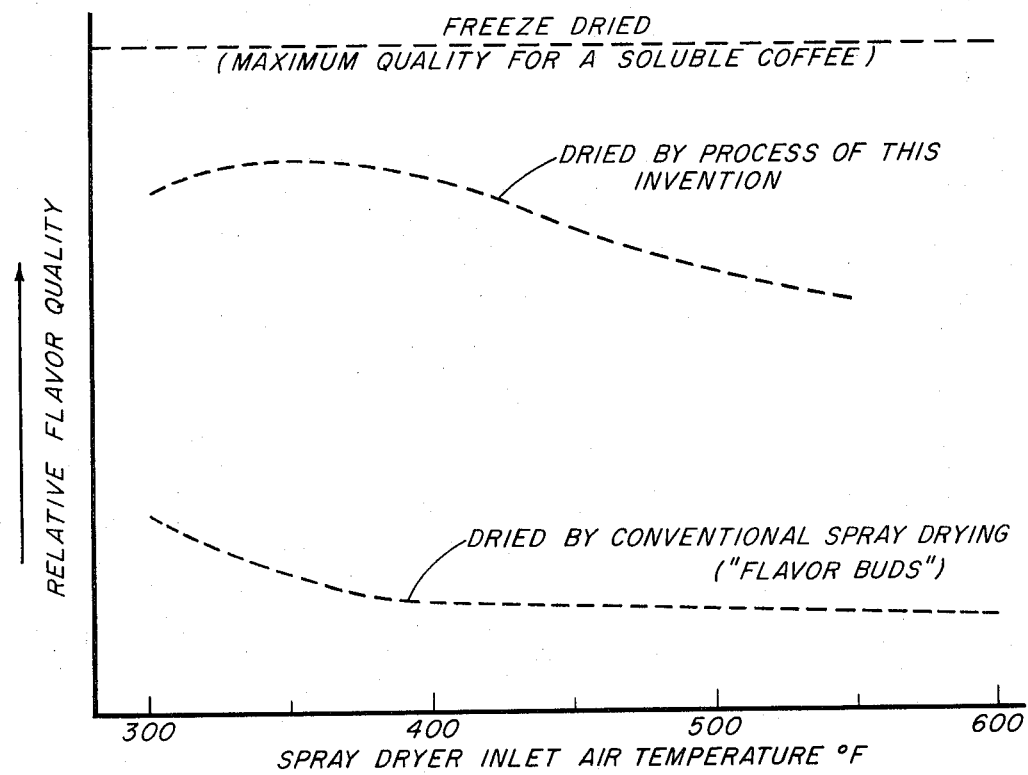

This is a continuation of application Ser. No. 20,949, filed Mar. 19, 1970 and now abandoned.

BACKGROUND OF THE INVENTION

This invention concerns a process for producing a high quality spray dried coffee. It specifically pertains to a combination of unique spray drying parameters which retain the desirable aroma and flavor constituents of high quality coffee extracts.

Spray drying has long been recognized as an economical process for commercially making a soluble coffee. In most commercial processes high inlet temperatures (500° F. or above) are used to cause rapid or flash evaporation of moisture, in order to obtain a sufficient productivity to make the operation economical.

In U.S. Pat. 3,345,182 entitled Preparing Aromatic Spray Dried Coffee, issued Oct. 3, 1967, a unique set of operating conditions is described for producing a quality soluble coffee product via spray drying. The use of high extract concentrations, 35 to 55%, and low dryer inlet temperatures, 150° to 300° F., are disclosed. The disclosure in this patent indicates that the aforementioned conditions combined with a droplet size of between 100 and 250 microns and an outlet temperature of from 150 to 260° F. yield a dry soluble coffee that is far superior to conventional spray dried coffees and which compares favorably to freeze dried coffees.

One major shortcoming with the process described in U.S. Pat. 3,345,182 is that the cost of spray drying, which is proportional to the inlet air temperature and product throughput, is significantly increased due to the low spray inlet air temperatures used throughout the process.

SUMMARY OF THE INVENTION

Quite unexpectedly, it has been discovered that the quality of a spray dried soluble coffee can be improved over that produced by any prior art process by using dryer inlet air temperatures in the range of 300 to 550° F. This improved soluble coffee is acheived by carefully selecting the proper operating parameters within the ranges hereinafter disclosed. It is the correct combination of several operating parameters which enable one to produce a high quality coffee which has retained its desirable aromatic and flavor constituents, while operating at conditions which are more economical than those described in U.S. Pat. 3,345,182.

In practicing the process of this invention a high quality extract having a solids concentration of from 31 to 40% is fed into the spray dryer at a temperature of from 30 to 60° F. The dryer inlet air temperature is maintained at from 300 to 550° F. and the outlet air temperature is maintained at from 190 to 230° F. The liquid extract is broken up into droplets having a maximum particle size of from 100 to 300 microns. Spray dryer nozzles are selected such that the desired drop size will be achieved at nozzle pressures of from 700 to 2500 p.s.i.g.

It has been found in practicing the process of this invention that the final product is substantially free of detectable chemical changes (such as the break down of sugars) which are associated with undesirable flavor changes in spray drying. It has also been found that coffee produced via the process of this invention retains a high percentage of the desirable volatile aromatics normally lost in conventional spray drying processes.

The particles produced in the spray dryer are very light in color and dusty in appearance and it is a preferred embodiment of this invention to agglomerate the spray dried particles in order to obtain a particle appearance which is more attractive to the consumer. Known agglomeration techniques may be used and it is preferred to use a process which does not expose the coffee to high air temperatures.

DESCRIPTION OF THE PREFERRED EMBODIMENT

It has been found that the quality of spray dried coffee varies with the dryer inlet air temperature, but that at temperatures as high as 550° F. a product significantly better than that obtained by conventional spray drying techniques can be achieved via the process of this invention. The quality of the dried product is found to increase as the dryer inlet temperature is reduced and a peak in quality is achieved at a temperature of about 300–350° F. FIG. 1 shows a comparison of the flavor produced by the process of this invention, conventional spray drying processes and freeze drying. Note that even when lower dryer inlet air temperatures are used in a conventional spray drying process, the product quality is significantly less than the quality of product produced by the process of this invention. The reason for this significant flavor difference is that it is a combination of processing variables which produces the desired and unexpected product improvement.

Figure 2:
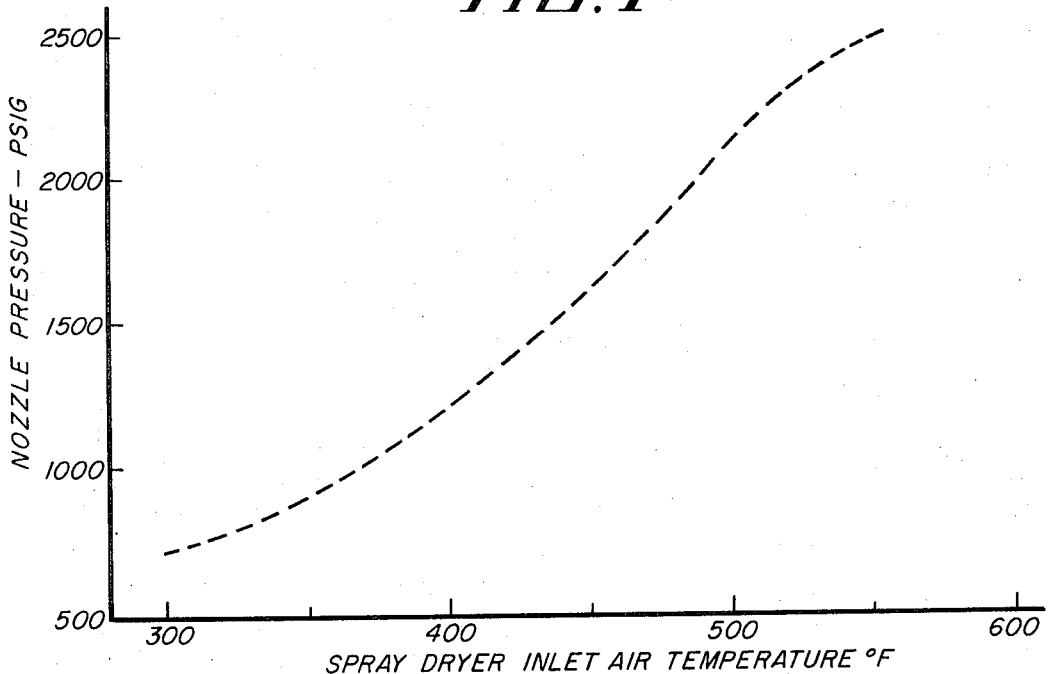
Figure 3:
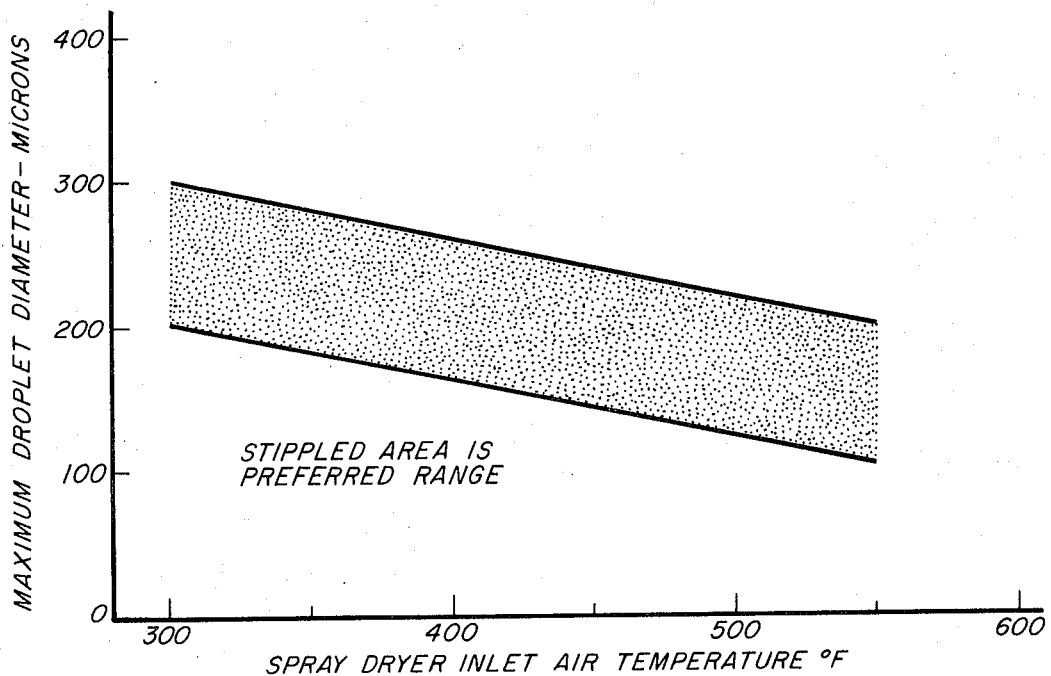

It has been found that the higher the inlet temperature, the smaller the drop size needed to produce a quality spray dried product. At dryer inlet temperatures of about 500° F. the preferred drop size is about 150 microns maximum, while at about 300° F. the preferred drop size is about 250 microns maximum. It has also been discovered that a core type spray drying nozzle produces a preferred droplet distribution for use in the process of this invention. Suitable nozzles are manufactured by the Spraying System Company as Spray Dry Nozzles. The key in selecting the proper nozzle, is to obtain a spray pattern which will avoid plastering the sides of the dryer at the pressures being used in the process of this invention. It is preferred to use a nozzle pressure of from 700 to 2500 p.s.i.g. Thus, a nozzle should be selected which will produce the desired drop size at the preferred pressure. It has been found that Spray Dry Nozzles from 40–56/21–27 (orifice/core size) produced the desired spray pattern at the aforementioned pressures. These nozzles have been successfully used in spray dryers having a diameter from 10 feet to 22 feet and a free drying height of from 17 feet to 30 feet. FIG. 2 shows a curve relating inlet air temperature and required nozzle pressure. FIG. 3 shows the approximate range of particle sizes to be obtained at particular dryer inlet air temperatures in order to obtain a quality product. It is a relatively simple matter for one skilled in the art to select a nozzle which will produce the desired particle size at a desired pressure, for a given inlet air temperature. The number of nozzles to be used in a particular spray dryer will depend upon the capacity of the individual nozzle selected, the desired productivity and the capacity of the dryer.

Figure 4:
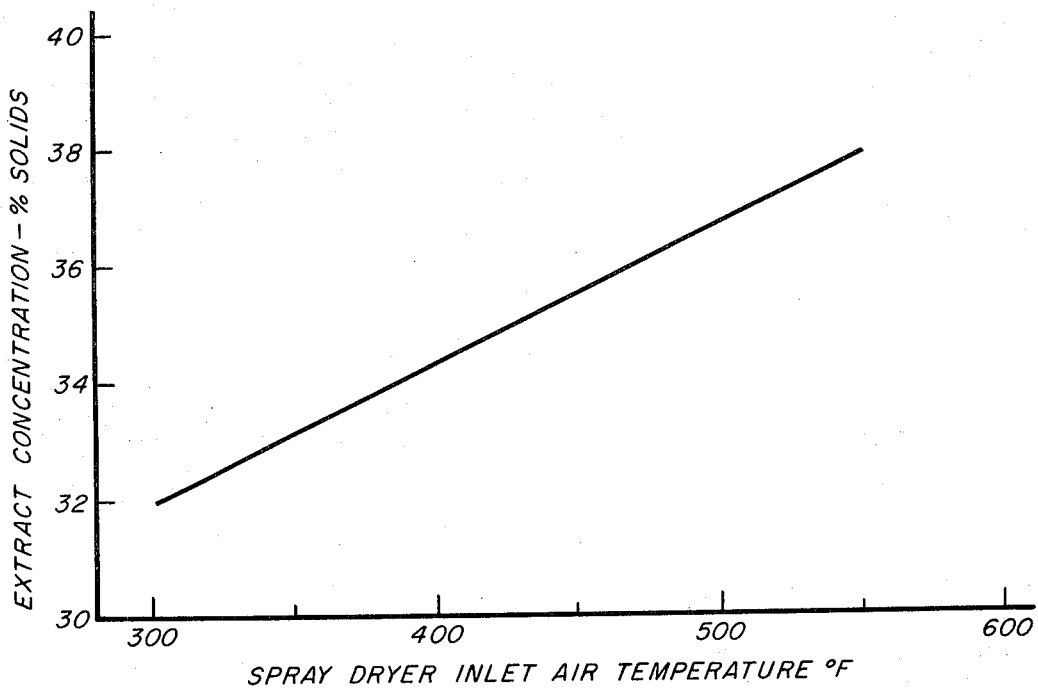

Surprisingly, it has been found that the extract concentration must be maintained within a rather narrow range in order to obtain a quality product when practicing the process of this invention. The minimum concentration necessary to obtain a quality product is 31% and the maximum concentration is about 40%. FIG. 4 shows the preferred extract concentration to be used with different dryer inlet air temperatures. Note that a slightly higher concentration extract is preferred as the inlet air temperature is increased. It has also been found that the temperature of the extract entering the spray dryer must be at a temperature of about 30 to 60° F. in order to obtain a quality spray dried product via the process of this invention. Preferably the temperature at the nozzle inlet will be below 50° F. Extract temperature refers to the actual temperature entering the spray dryer and any increase in extract temperature due to a high pressure feed pump must be taken into account in order to insure the desired temperature at the spray dryer nozzle itself.

It has also been found that the outlet air temperature should be maintained between about 190–230° F. The outlet temperature may be adjusted to insure a stable moisture content in the dry particles of between 2.5% moisture content below 4% is desired for storage stability.

The particles produced via the process of this invention are light and dusty in appearance. It is a preferred embodiment of this invention to agglomerate the spray dried particles by known prior art processes to obtain larger and darker particles preferred by the consumer.

There are many prior art processes describing methods of obtaining desired aromatic volatile constituents from coffee prior to spray drying the coffee. It is a preferred embodiment of this invention to collect and add to the concentrated extract desirable aromatic volatiles as a means of achieving a high quality extract prior to spray drying.

The extract may be concentrated to the desired solids level in any manner which will avoid degradation of the extract quality prior to drying. Thus, extraction technique which yield a high concentration, high quality extract may be utilized. Alternatively, concentration techniques such as freeze concentration may be used to increase the solids content of the extract obtained from extractors to a desired concentration.

The prior art describes a process wherein volatiles are vacuum stripped from the extract, the extract is then concentrated by evaporation and the volatiles are added back to the concentrated extract. Such a process may also be used in practicing the process of this invention.

The process of this invention will be further described by the following examples:

EXAMPLE I

A high flavor quality extract was freeze concentrated to a solids concentration of 38%. The extract was then divided into three batches and spray dried. Batch number 1 was dried at the process conditions of this experiment. Batch number 2 was dried at the same concentration as batch number 1 by utilizing spray dryer nozzles which delivered droplets equivalent to the large "flavor bud" in a typical spray dried commercial product. Batch number 3 was diluted with water to a solids concentration of 25% and dried utilizing the same nozzles as for batch number 2 and a lower nozzle pressure and also developed "flavor buds". The spray drying runs were conducted on a 12 foot diameter syray drier and the extract temperature was 50° F. The following table summarizes the operating conditions:

|  | Batch 1 | Batch 2 | Batch 3 |
|---|---|---|---|
| Inlet air temperature (° F.) | 525 | 525 | 525 |
| Outlet air temperature (° F.) | 190 | 225 | 245 |
| Nozzle used | (1) | (2) | (2) |
| Extract pressure (p.s.i.) | 2,400 | 750 | 150 |
| Extract solids concentration (percent) | 38 | 38 | 25 |
| Product moisture | 4.1 | 4.8 | 3.3 |

1 Spraying Systems Core Type 52/21TC.
2 Spraying Systems Whirljet Type 3/2TC.

The dry soluble coffee was flavor tested by expert tasters. The product produced with batch number 1 (by the process of this invention) was described as having a high quality which was close to the flavor character associated with freeze dried coffee. Both of the controls dried as batches 2 and 3 were described as having typical spray dried flavor characteristics and were significantly less preferred than the product from batch number 1. The expert opinion was confirmed in a store test where over 300 consumers were asked to compare coffee prepared from batch number 1 vs. coffee prepared from batch number 2. Statistical analysis of the results showed that the product prepared from batch number 1 was significantly preferred by the average consumer. Note that these comparisons strongly point up the need for the total combination of variables described and claimed in this invention and that extract concentration alone does not produce the desired flavor enhancement in a spray dried product. Also, the moisture content of the product produced from batch number 2 was somewhat higher than that produced from batch number 1. While the higher moisture content may not be shelf stable for long periods of time, the initial effect of higher moisture is improved flavor quality. In spite of this the product produced via the process of this invention had the significantly preferred flavor. It is also significant that the expert tasters described the product produced from batch number 1 as having freeze dried character since freeze drying is considered the ultimate processing technique for preserving flavor of dried products.

EXAMPLE II

A quality extract was spray dried on a commercial 22 foot diameter spray dryer under the following conditions: inlet air temperature 395° F., outlet air temperature 210° F., extract concentration 31.5% solids, extract temperature 60° F., six nozzles 52/21TC, Spraying System core type nozzles, nozzle pressure 1200 p.s.i., final product moisture 3.0%.

The dry product was flavor evaluated and found to have a quality very close to that of a freeze dried coffee and significantly better than standard spray dried powder.

EXAMPLE III

The same extract dried in Example II was dried under the following conditions: inlet air temperature 315° F., outlet air temperature 197° F., extract concentration 32%, extract temperature 50° F., five nozzles 52/21, Spray System core type nozzles, nozzle pressure 700 p.s.i., final product moisture 3.8%.

Flavor evaluation of the dry product showed that this sample was slightly preferred over that produced in Example II and was almost identical to a freeze dried sample.

The foregoing examples were for illustrative purposes only and the scope of the invention is defined in the appended claims.

What is claimed is:

1. An economical process for producing soluble coffee of improved flavor and taste which comprises forming an aqueous extract of roasted coffee solids, and spray drying said extract at a maximum droplet size of between 100 and 300 microns using a spray drying nozzle pressure of from 700 to 2500 p.s.i.g., an inlet air temperature of between 300° F. and 550° F., and an outlet air temperature of between 190° F. and 230° F., said extract having a temperature of between 30° F. and 60° F. at the inlet to the dryer, said extract of roasted coffee solids having a concentration from 32% solids at an inlet air temperature of 300° F. increasing to 38% solids at an air inlet temperature of 550° F.

2. The process of claim 1 wherein the maximum droplet size ranges from 200–300 microns at an inlet air temperature of about 300° F. decreasing to 100–200 microns at an inlet air temperature of about 550° F.

3. The process of claim 2 wherein aromatic volatiles are added to the extract prior to spray drying.

4. The process of claim 2 wherein aromatic volatiles are stripped from the coffee extract prior to concentration, the extract is concentrated and the volatiles are added back to the concentrated extract.

5. The process of claim 2 wherein the spray dried particles are agglomerated to obtain larger and darker particles.

6. The process of claim 1 wherein the roasted coffee is decaffeinated coffee.

References Cited
UNITED STATES PATENTS

| | | | |
|---|---|---|---|
| 3,345,182 | 10/1967 | Huste et al. | 99—71 |
| 2,933,395 | 4/1960 | Adler et al. | 99—71 |

FRANK W. LUTTER, Primary Examiner

W. L. MENTLIK, Assistant Examiner

UNITED STATES PATENT OFFICE
CERTIFICATE OF CORRECTION

Patent No. 3,798,342      Dated March 19, 1974

Inventor(s) Arno Huste

It is certified that error appears in the above-identified patent and that said Letters Patent are hereby corrected as shown below:

Column 1, line 49, after the word "from" change "150" to --130--.

Column 1, line 57, add the word --dryer-- in front of "inlet."

Column 1, line 64, before "by" and after "is" change "acheived" to --achieved--.

Column 3, line 31, before "mois-" and after "between" change "2.5% mois-" to -- 2-5%. A mois- --.

Signed and sealed this 17th day of September 1974.

(SEAL)
Attest:

McCOY M. GIBSON JR.
Attesting Officer

C. MARSHALL DANN
Commissioner of Patents